Aug. 6, 1935.    G. A. LYON    2,010,099
TIRE COVER SIDE PLATE
Filed June 30, 1931    2 Sheets-Sheet 1
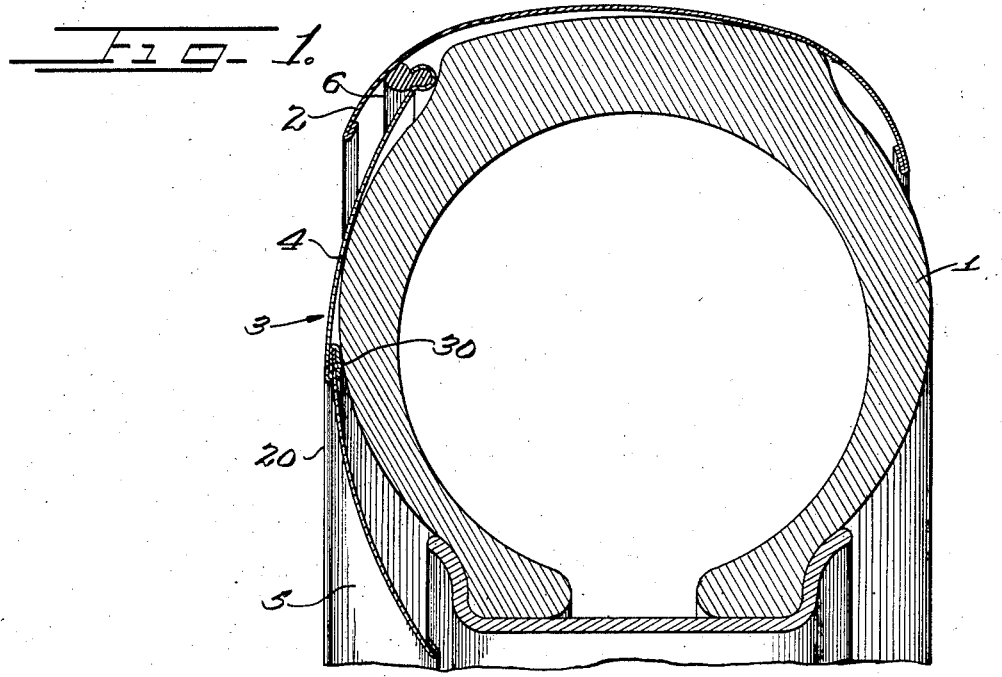
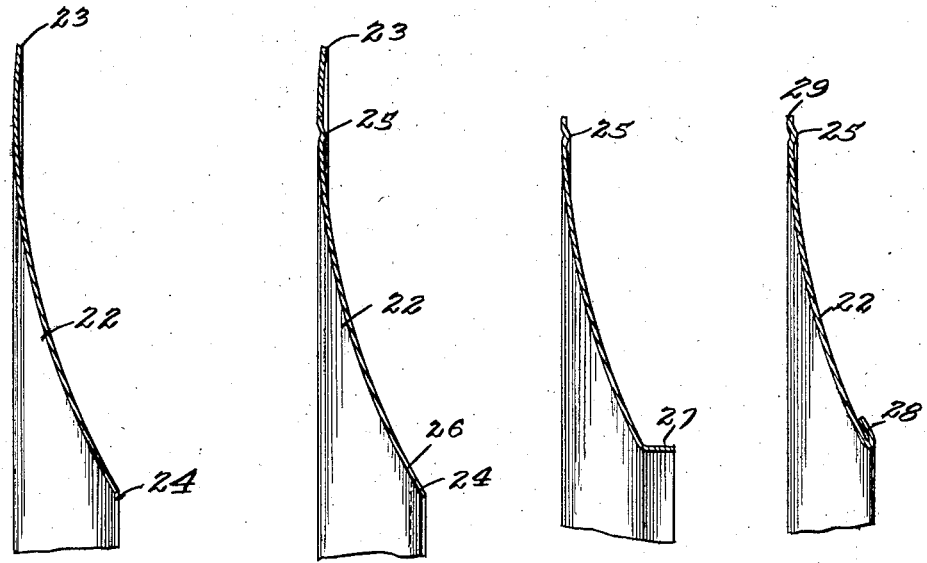
Inventor
George Albert Lyon.

Aug. 6, 1935.  G. A. LYON  2,010,099
TIRE COVER SIDE PLATE
Filed June 30, 1931  2 Sheets-Sheet 2
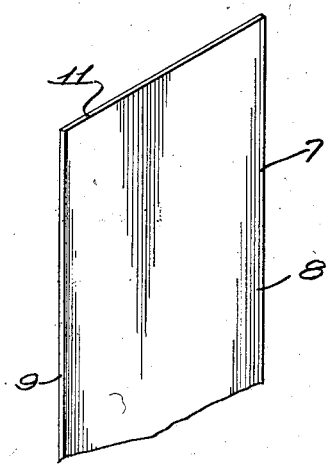
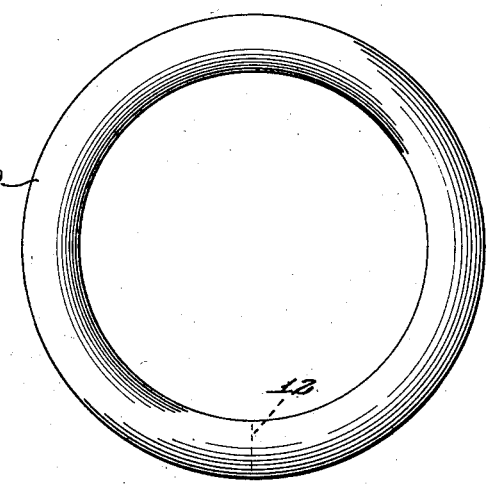
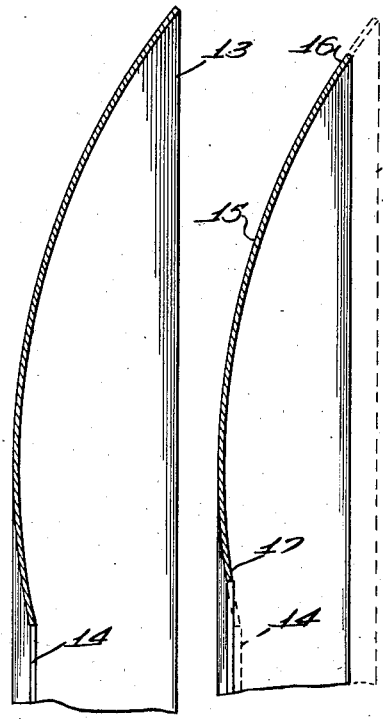
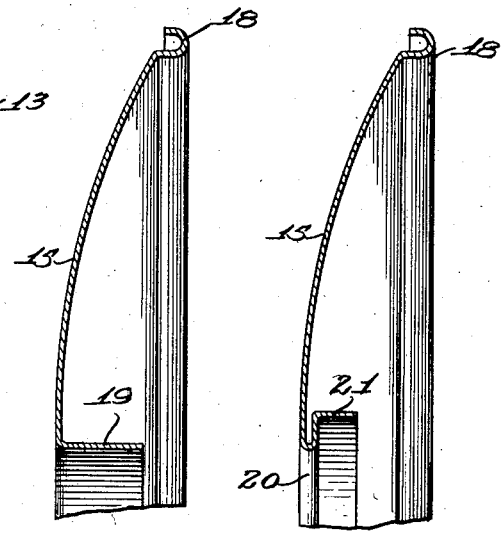
INVENTOR
George Albert Lyon.
by Charles Hill
ATTYS.

Patented Aug. 6, 1935

2,010,099

UNITED STATES PATENT OFFICE 2,010,099

TIRE COVER SIDE PLATE

George Albert Lyon, Allenhurst, N. J., assignor to Lyon Incorporated, Asbury Park, N. J., a corporation of Delaware Application June 30, 1931, Serial No. 547,930

4 Claims. (Cl. 150—54)

This invention relates to tire covers, and more particularly to a ring-like side plate for use on a tire cover of the type known as the Lyon cover as well as to a method of manufacturing the side plate.

It is the aim of this invention to provide a ring-like side part or plate which is of such a construction that waste of material is minimized and the plate may be manufactured as part of a continuous production system.

In the light of this statement it will of course be evident that the principal object of this invention is to provide an improved ring-like side plate for use in a tire cover.

In accordance with the general features of this invention there is provided a ring-like plate composed of a pair of concentric strips formed for connection throughout the circumferential length of the plate and at a median point in the plate and being of such a convex curvature as to be capable of being separately manufactured by the use of a rolling process as distinguished from a punch press process.

Other objects and features of this invention will be apparent from the disclosures in the specification and the accompanying drawings, in which Figure 1 is an enlarged fragmentary sectional view of a tire to which a tire cover formed in accordance with the present invention is applied.

Figure 2 is a fragmentary perspective view of a flat strip of sheet metal from which each part of the side plate made in accordance with the present invention may be fabricated.

Figure 3 shows in elevation an outer part of a tire cover side plate made from the strip of material shown in Figure 2.

Figure 4 is an enlarged fragmentary sectional view of the same after the rolling operation on the strip of metal.

Figure 5 is a view similar to Figure 4, but showing in dotted lines the marginal portions which have been removed.

Figure 6 is a view similar to Figure 5, but showing the side plate part in a further state of completion.

Figure 7 is a view similar to Figure 6 but showing the side plate part completed and ready for assembly.

Figure 8 is a view similar to Figure 4 but showing the complemental inner side plate piece as it appears after the rolling operation on the strip of metal.

Figure 9 is a view similar to Figure 8 with the dotted lines indicating the marginal portions to be removed and also showing this side plate part in a further state of completion.

Figure 10 is a view similar to Figure 9 but showing this side plate part in a still further state of completion.

Figure 11 is a similar view showing the inner side plate part complete and ready for assembly with the outer part.

Referring now more particularly to the drawings wherein the same parts are indicated throughout by the same reference characters, the tire 1 is shown provided with a tire cover consisting of a preferably resilient ring member or rim 2 and a composite side plate 3.

The side plate 3 made in accordance with the present invention comprises an outer member 4 and an inner member 5, one or both of which may be made of stainless steel or like material or may be chrome plated or may be covered with a coat of enamel, lacquer or the like, preferably harmonizing with the shade of the automobile body in connection with which it is to be used.

The usual cushioning means 6 carried by the side plate 3 prevents metal to metal contact between said plate and the rim 2.

Side plates of the general character herein disclosed have formerly been made in one piece by stamping out of a square piece of metal. This has been a very wasteful procedure for the reason that inasmuch as the side plate has an annular shape, the corner portions and a central disc portion of substantial size remaining after the side plate was stamped out had to be sold for scrap at a very much lower figure than that for which the original plate was purchased. By producing the side plate in accordance with the principles to be now outlined, a very great saving is effected. In addition, by making a composite side plate of the character herein disclosed, one part of the plate may be coated with enamel, lacquer or the like without the coating material touching the rubber or like cushioning material 6, so that the latter will not lose a large part of its efficiency as has been the case in the past where the side plate has been made of one piece so that when lacquer or the like was applied it contacted the rubber and partially dissolved the same. Even where, in the past, the one piece side plate has been enameled or otherwise coated and then the coating allowed to dry before the rubber was crimped in place, the act of crimping produced cracks in the coating.

In accordance with the present invention, a strip 7 of sheet metal somewhat wider than the ultimate width of the outer part 4 of the side plate is rolled in such a manner that one edge 8 is turned at a greater speed than the other edge 9 until the strip 7 is substantially circular in form as indicated at 10 in Figure 3. The ends 11 of the strip 7 are then butt-welded or otherwise joined as indicated in dotted lines at 12 in Figure 3, and the flash or burrs ground off smooth. The annulus 10 is then in the form in cross section shown in Figure 4.

Due to the rolling action on the edges 8 and 9 of the strip 7 the outer and inner marginal portions 13 and 14 will be somewhat rough and these portions, indicated also in Figure 5 in dotted lines, are removed either before or after the welding operation just mentioned. The remainder or body portion 15 is fairly smooth throughout after the marginal portions 13 and 14 have been removed, and the marginal edge portions 16 and 17 are thereupon spun to form respectively a substantially U-shaped bulged or beaded portion 18 and an inner substantially cylindrical portion 19. The latter portion is subsequently bent by a spinning or other suitable operation at 20 to form a smooth edge, the free portion of the cylindrical portion 19 being enlarged as shown at 21. It will be noted that the rolling operation imparts to the strip 7 a dished shape so that when the outer side plate part 4 is applied to the side wall of the tire 1, it will conform approximately to the contour thereof.

The inner side plate part 5 is likewise formed from a strip 7 by a rolling operation in the shape of an annulus with an arcuate cross-section constituting in effect a continuation of the arcuate shape of the first or outer part 4. The annulus 22 thus formed has, as in the case of the first mentioned annulus, rough marginal portions 23 and 24, which portions may be removed before or after the projection 25 is formed in the member 22. The projection 25 may be in the convex or concave surface of the annulus 22. After the portions 23 and 24 are removed, the annulus 22 is substantially smooth throughout, and the inner marginal portion 26 is spun to provide a substantially cylindrical flange 27 which is thereupon return bent upon the body of the member 22 as indicated in Figure 11 at 28. The member 22 is now ready for assembly with the member 15 shown in Figure 7.

It will be understood that the parts 15 and 22 are so formed that the outer peripheral edge 29 of the member 22 will fit in the cylindrical portion 21 of the member 15 as shown in Figure 1. When the parts are thus brought together, the flange 21 is spun or crimped radially inward and laterally against the outer peripheral portion of the part 22, and the projecting portion 25 will be forced against the portion 21 with sufficient pressure to form a corresponding projection 30 in the portion 21, and the two projecting portions will engage each other with substantially spring pressure so that not only will the parts 4 and 5 be interlocked permanently but by reason of the spring pressure rattling or any looseness in the interlocked connection is eliminated.

The cushioning element 6 may be crimped in the bulged portion 18 any time after the latter is formed.

It will be seen from the foregoing that, compared to the method heretofore employed in forming side plates in one piece, the waste incurred in accordance with the principles of the present invention is practically negligible. In addition, aside from the waste of materials, the cost of production is substantially reduced in accordance with this invention for the reason that in stamping, the operations are punctuated or intermittent whereas in rolling, the strip 7 may be continuous and separate means aside from the rolling apparatus, or in combination with the latter if desired, may be employed to cut off the strip metal as it is rolled in appropriate lengths from which the parts 4 and 5 may be fabricated. In addition, where it is desired to have a contrast in color between the parts 4 and 5, the part 5 may be enameled or otherwise coated and after the coating has dried the part 5 may be interlocked with the part 4. By so doing, the enamel or the like cannot contact the rubber or like cushioning member 6 so that the efficiency of the latter will be unimpaired in use.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A spare tire cover comprising an arcuate plate-like member shaped circumferentially and radially to substantially conform to the front wall of a tire, said member having substantially foremost thereof a multiple thickness reinforcing impact receiving portion substantially coextensive with the cover and constructed to resist deformation and protect the remainder of the member from injury by impact or by rough supporting surfaces when not mounted on a spare tire carried by a vehicle, said portion constituting a connection between two arcuate plate-like parts, said connection comprising resiliently interlocked margins.

2. In a tire cover construction, a circular sheet metal member formed to cover the front wall of a tire and comprising a plurality of interlocked concentric strips whose ends are joined to form a single plate, said plate being transversely bulged forwardly to conform substantially with the transverse curvature of the wall of the tire, and being reinforced along the line of interlocking and the reinforced portion being disposed substantially foremost so as to provide an impact receiving and withstanding portion for shielding the adjacent parts of the plate from injury to which they would otherwise be subject, said portion projecting so as to space said parts from the tire.

3. In a tire cover construction, a substantially form-retaining member of sheet material formed to cover the front wall of the tire and with its front surface substantially smooth and unobstructed, said plate being transversely bulged to conform substantially to the transverse curvature of the wall of the tire, and being reinforced inwardly from its outer periphery to provide an impact receiving and withstanding portion in advance of the adjacent parts of the member to shield them from injury to which they would otherwise be subject, said portion projecting so as to space said parts from the tire.

4. In a tire cover construction, a substantially form-retaining member of sheet material formed to cover the front wall of the tire and transversely bulged to conform substantially to the transverse curvature of the wall of the tire, and being reinforced inwardly from its outer periphery to provide an impact receiving and withstanding portion in advance of the adjacent parts of the member to shield them from injury to which they would otherwise be subject, said portion projecting so as to space said parts from the tire.

GEORGE ALBERT LYON.